United States Patent
Townsend et al.

(10) Patent No.: US 10,782,846 B2
(45) Date of Patent: Sep. 22, 2020

(54) METHOD AND APPARATUS FOR INTUITIVE MULTITASKING

(71) Applicant: NOKIA TECHNOLOGIES OY, Espoo (FI)

(72) Inventors: Karl Townsend, Los Altos, CA (US); Rob Haitani, Menlo Park, CA (US)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/276,015

(22) Filed: Feb. 14, 2019

(65) Prior Publication Data

US 2019/0179489 A1 Jun. 13, 2019

Related U.S. Application Data

(63) Continuation of application No. 13/341,545, filed on Dec. 30, 2011, now Pat. No. 10,248,278.

(51) Int. Cl.
G06F 3/048 (2013.01)
G06F 9/451 (2018.01)
G06F 3/0481 (2013.01)

(52) U.S. Cl.
CPC .......... *G06F 3/0481* (2013.01); *G06F 9/451* (2018.02); *G06F 2203/04803* (2013.01)

(58) Field of Classification Search
CPC . G06F 3/048; G06F 9/451; G06F 2203/04803
See application file for complete search history.

(56) References Cited

U.S. PATENT DOCUMENTS

| | | | |
|---|---|---|---|
| 2008/0256483 | A1 | 10/2008 | Katsuranis |
| 2008/0313305 | A1 | 12/2008 | Long |
| 2009/0031247 | A1 | 1/2009 | Walter et al. |
| 2009/0313584 | A1 | 12/2009 | Kerr et al. |
| 2010/0050092 | A1 | 2/2010 | Williams et al. |

(Continued)

FOREIGN PATENT DOCUMENTS

| | | |
|---|---|---|
| CN | 101447998 A | 6/2009 |
| CN | 101568914 A | 10/2009 |

(Continued)

OTHER PUBLICATIONS

Office Action for European Application No. 12 813 069.7 dated Feb. 21, 2020, 4 pages.

(Continued)

*Primary Examiner* — Xuyang Xia
(74) *Attorney, Agent, or Firm* — Alston & Bird LLP

(57) ABSTRACT

A method, apparatus and computer program product are provided for intuitive multitasking. An indication may be received at a first device, of an incoming request for electronic communication received at a second device. A user may utilize a user interface of the first device to accept or decline the request for electronic communication received at the second device. The communication may be a phone call, short message service message, email, and/or the like. A first user interface area may be associated with a first device, and a second user interface area may be associated with the second device. The first and second interfaces areas may be provided concurrently on the first device to enable the user to interact with the second device using the user interface of the first device.

20 Claims, 10 Drawing Sheets

(56) References Cited

U.S. PATENT DOCUMENTS

| | | | | |
|---|---|---|---|---|
| 2010/0182994 | A1* | 7/2010 | Rahman | H04L 12/66 370/352 |
| 2010/0311396 | A1* | 12/2010 | Kim | H04M 3/42195 455/414.1 |
| 2011/0102357 | A1 | 5/2011 | Kajitani | |
| 2011/0119609 | A1 | 5/2011 | Bhatt et al. | |
| 2011/0181496 | A1* | 7/2011 | Lanier | G06Q 20/102 345/2.2 |
| 2011/0251902 | A1 | 10/2011 | Nagarajayya | |
| 2012/0110474 | A1 | 5/2012 | Chen | |
| 2012/0144347 | A1 | 6/2012 | Jo et al. | |
| 2012/0162073 | A1 | 6/2012 | Kryze et al. | |
| 2012/0272149 | A1 | 10/2012 | Lee et al. | |
| 2013/0029636 | A1* | 1/2013 | Ivanov | H04W 4/70 455/410 |

FOREIGN PATENT DOCUMENTS

| | | |
|---|---|---|
| CN | 101674110 A | 3/2010 |
| EP | 1 684 515 A1 | 7/2006 |
| EP | 2 306 307 A2 | 4/2011 |
| EP | 2 369 461 A2 | 9/2011 |
| EP | 2 557 484 A1 | 2/2013 |
| JP | 2006-209747 A | 8/2006 |
| JP | 2010-009335 A | 1/2010 |
| JP | 2011-070511 A | 4/2011 |
| JP | 2011-203956 A | 10/2011 |
| JP | 2011-221822 A | 11/2011 |

OTHER PUBLICATIONS

"Let's listen to the music by mobile phones (4), the smart usage of the LISMO PORT, import and transfer of music CD", Feb. 15, 2009, URL: http://dzone.sakura.ne.jp/blog/2009/02/lismo-port----4.html.

Bright, Peter, "Hands-On with Windows 8: A PC Operating System for the Tablet Age," arstechnica.com, Retrieved from <http://arstechnica.com/information-technology/2011/09/hands-on-with-windows-8-a-pc-operating-system-for-the-tablet-age/> on Apr. 3, 2013, 6 pages.

International Searching Authority, International Search Report and Written Opinion for International Application No. PCT/FI2012/051305, dated Apr. 12, 2013, 14 pages, European Patent Office, the Netherlands.

Japanese Office Action for corresponding Japanese Patent Application No. 2014-549510 dated Jul. 21, 2016, 2 pages.

Liu, M., Practical Textbook for Rudiments and Improvements on Surfing the Internet by Computer, Practical Tutorials for Introduction and Improvement of Computer Internet Access, The China Railway Press, (dated Jan. 2004), 15 pages.

Norman, Jonathan, "Review: Side by Side for the iPad," The iPad Fan, Sep. 20, 2010, Retrieved from <http://www.theipadfan.com/review-side-side-ipad/> on Apr. 3, 2013.

Office Action for Chinese Application No. 201280070826.4 dated Aug. 31, 2016.

Office Action for Chinese Application No. 201280070826.4 dated Jan. 5, 2018 with English Summary, 9 pages.

Office Action for Chinese Application No. 201280070826.4 dated Jun. 2, 2017, 22 pages total.

Office Action for European Application No. 12813069.7 dated Jan. 28, 2016, 5 pages.

Office Action for European Application No. 12813069.7 dated Jun. 7, 2018, 5 pages.

Office Action for U.S. Appl. No. 13/341,545 dated Apr. 26, 2018, 20 pages.

Office Action from Japanese Patent Application No. 2014-549510 dated Mar. 4, 2016.

Sifteo Website; downloaded on Mar. 12, 2012 at https://www.sifteo.com/.

Webtop Application Overview; downloaded on Mar. 12, 2012 at http://developer.motorola.com/docstools/library/webtop-application-overview/.

Office Action for Chinese Application No. 201280070826.4 dated Jul. 26, 2018.

* cited by examiner

METHOD AND APPARATUS FOR INTUITIVE MULTITASKING

CROSS REFERENCE TO RELATED APPLICATION

This application is a continuation of and claims priority to U.S. application Ser. No. 13/341,545, filed Dec. 30, 2011, titled "METHOD AND APPARATUS FOR INTUITIVE MULTITASKING," the entire contents of which are hereby incorporated by reference.

TECHNOLOGICAL FIELD

An example embodiment of the present invention relates generally to techniques for using electronic devices and, more particularly, to a method and apparatus for intuitive multitasking.

BACKGROUND

Considering the prevalence of personal computers, cellular telephones, personal digital assistants (PDAs) and other computing and/or communications devices, users may sometimes desire to use more than one application, or more than one view of a single application at once. For example, a person may be viewing a webpage in a browser when they desire to email the page they are viewing to a friend without closing the browser. As another example, a person may be composing an e-mail to a first person and wish to view another email to a second person without closing the first email.

In some instances users may even desire to use more than one device at once. For example, a person may be using one device when they suddenly receive a phone call from a friend on a second device. As another example, a person may be engaged in a conversation with a friend on a first device and suddenly wish to share with that friend some piece of content that they are viewing on a second device. The person may wish to do either of these tasks without diverting their attention away from whichever device they are using at the time.

BRIEF SUMMARY

A method, apparatus and computer program product are therefore provided according to an example embodiment of the present invention for permitting a person to multitask in an intuitive manner. In this regard, the method and apparatus of one embodiment may provide for user interaction with multiple applications, multiple views of a single application, or multiple devices in a manner that is intuitive to the user. Accordingly, the experience of a user multitasking with multiple applications, multiple views of a single application, or multiple electronic devices may be improved in accordance with the method, apparatus and computer program product of an example embodiment of the present invention.

In one embodiment, a method is provided that includes causing a first user interface associated with a first device, a first application, or a first view of a single application to be presented, the first user interface defining an initial user interface area. The method of this embodiment may also include receiving an indication to present a second user interface associated with a second device, a second application, or a second view of the single application and causing the second user interface to be presented. In order to allow the user to multitask with the first and second devices, applications, or views of the single application in an intuitive manner, the method of this embodiment may cause the second user interface to be presented at least partially within the initial user interface area and also cause the first user interface to be presented concurrent with the second user interface so as to define a resized user interface area that is smaller than the initial user interface area and is at least partially within the initial user interface area.

In another embodiment, the method may also include controlling the first device, the first application, or the first view of the single application with user input received via the first user interface and controlling the second device, the second application, or the second view of the single application with user input received via the second user interface. In yet another embodiment, the method may include receiving user input requesting to transfer content to the second device, the second application, or the second view of the single application and, in response to the user input, permitting the second device, application, or view to access the content. Another embodiment may include receiving user input requesting to transfer content to the first device, the second application, or the second view of the single application and, in response to the user input, permitting the first device, application, or view to access the content.

In a further embodiment, an apparatus is provided that includes at least one processor and at least one memory including program code instructions with the at least one memory and the program code instructions being configured to, with the processor, cause the apparatus to at least cause a first user interface associated with a first device, a first application, or a first view of a single application to be presented, the first user interface defining an initial user interface area. The at least one memory and the program code instructions may also be configured to, with the processor, cause the apparatus of this embodiment to receive an indication to present a second user interface associated with a second device, a second application, or a second view of the single application and cause the second user interface to be presented. In order to allow the user to multitask with the first and second devices, applications, or views in an intuitive manner, the at least one memory and the program code instructions may also be configured to, with the processor, cause the apparatus to cause the second user interface to be presented at least partially within the initial user interface area and also cause the first user interface to be presented concurrent with the second user interface so as to define a resized user interface area that is smaller than the initial user interface area and is at least partially within the initial user interface area.

In another embodiment, the at least one memory and the program code instructions may also be configured to, with the processor, cause the apparatus to control the first device, the first application, or the first view of the single application with user input received via the first user interface and control the second device, the second application, or the second view of the single application with user input received via the second user interface. The at least one memory and the program code instructions may also be configured to, with the processor, cause the apparatus to receive user input via the first user interface requesting to transfer content to the second device, the second application, or the second view of the single application and, in response to the user input, permit the second device, application, or view to access the content. In yet another embodiment, the at least one memory and the program code instructions may also be configured to, with the processor, cause the apparatus to receive user input via the second user interface requesting to transfer content to the first device, the first application, or the first view of the single application and, in response to the user input, permit the first device, application, or view to access the content.

In a further embodiment, a computer program product is provided that includes a non-transitory computer readable medium storing computer program code portions therein. The computer program code instructions are configured to, upon execution, cause an apparatus to at least cause a first user interface associated with a first device, a first application, or a first view of a single application to be presented, the first user interface defining an initial user interface area. The computer program code instructions are configured to, upon execution, cause the apparatus of this embodiment to receive an indication to present a second user interface associated with a second device, a second application, or a second view of the single application and cause the second user interface to be presented. In order to allow the user to multitask with the first and second devices, applications, or views in an intuitive manner, the computer program code instructions are configured to, upon execution, cause the apparatus to cause the second user interface to be presented at least partially within the initial user interface area and also cause the first user interface to be presented concurrent with the second user interface so as to define a resized user interface area that is smaller than the initial user interface area and is at least partially within the initial user interface area. In one embodiment, the computer program code instructions are configured to, upon execution, cause the apparatus to control the first device, the first application, or the first view of the single application with user input received via the first user interface and control the second device, the second application, or the second view of the single application with user input received via the second user interface.

In a still further embodiment, an apparatus is provided that includes means for causing a first user interface associated with a first device, a first application, or a first view of a single application to be presented, the first user interface defining an initial user interface area. The apparatus may also include means for receiving an indication to present a second user interface associated with a second device, a second application, or a second view of the single application and means for causing the second user interface to be presented. The apparatus may also include means for causing the second user interface to be presented at least partially within the initial user interface area and also means for causing the first user interface to be presented concurrent with the second user interface so as to define a resized user interface area that is smaller than the initial user interface area and is at least partially within the initial user interface area.

In another embodiment, the apparatus may include means for controlling the first device, the first application, or the first view of the single application with user input received via the first user interface and means for controlling the second device, the second application, or the second view of the single application with user input received via the second user interface. The apparatus may also include means for receiving user input requesting to transfer content to the second device, the second application, or the second view of the single application and means for permitting the second device, application, or view to access the content in response to the user input. In yet another embodiment, the apparatus may also include means for receiving user input requesting to transfer content to a first device, a first application, or a first view of a single application and means for permitting the first device, application, or view to access the content in response to the user input.

BRIEF DESCRIPTION OF THE DRAWINGS

Figure 1:
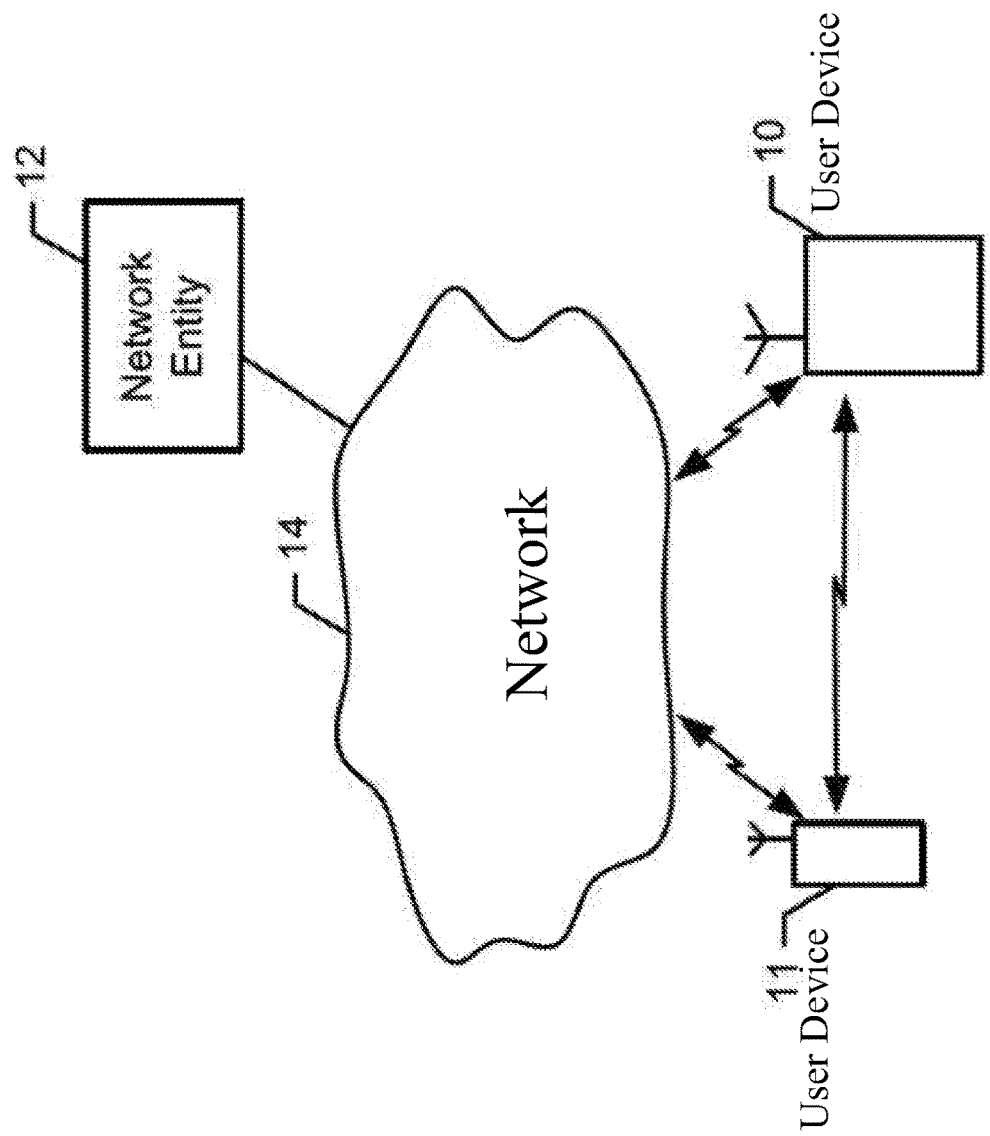
Figure 2:
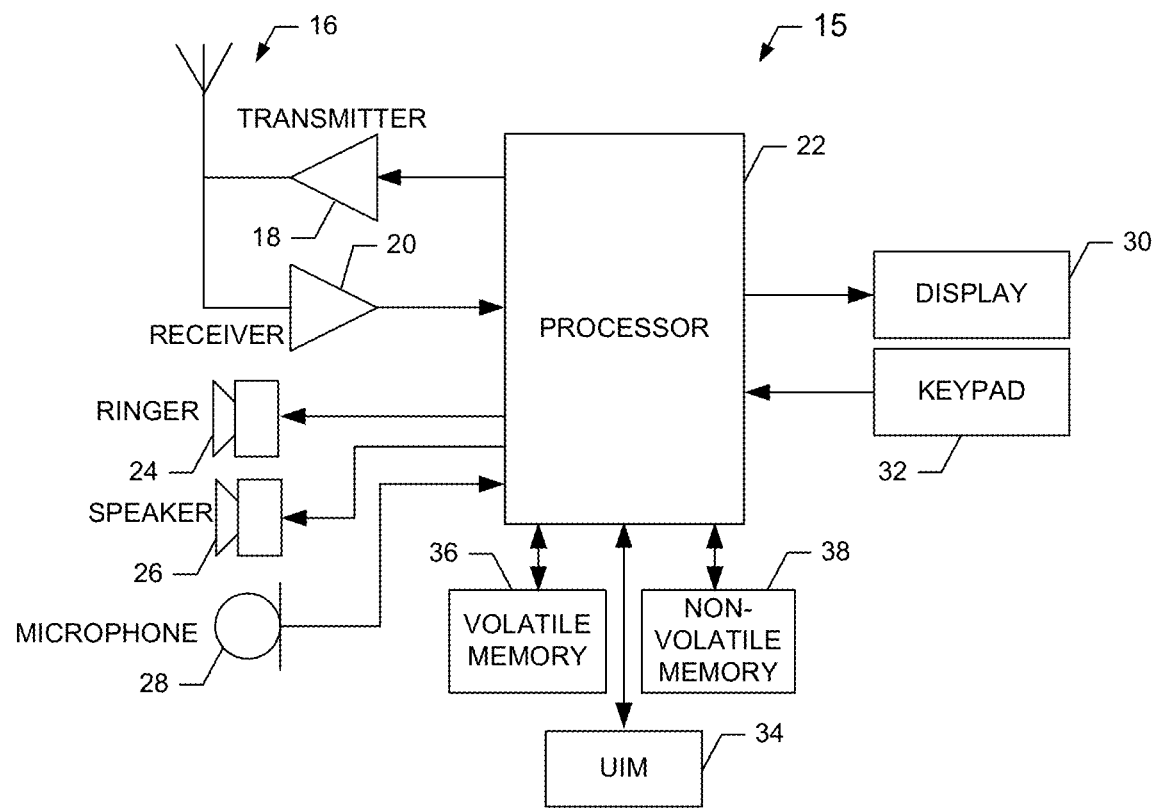
Figure 3:
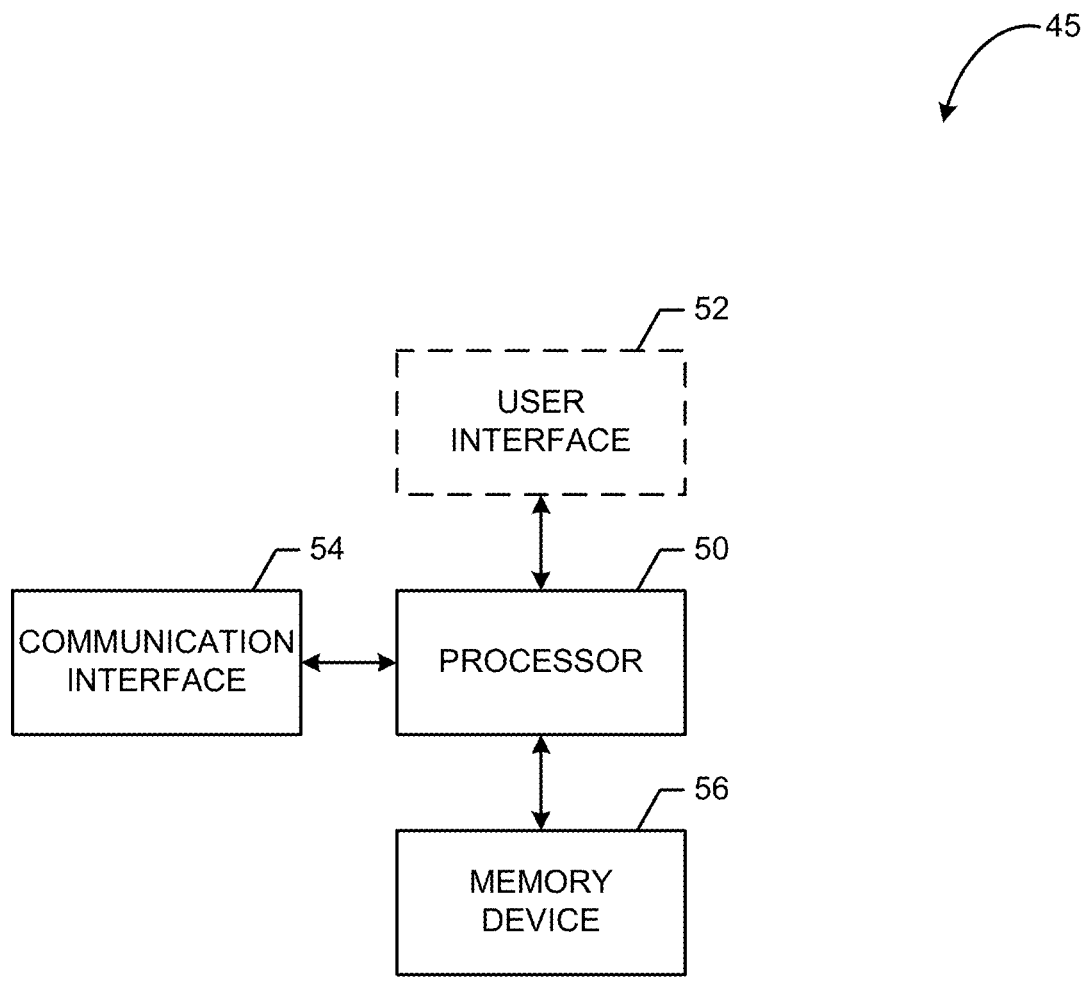
Figure 4:
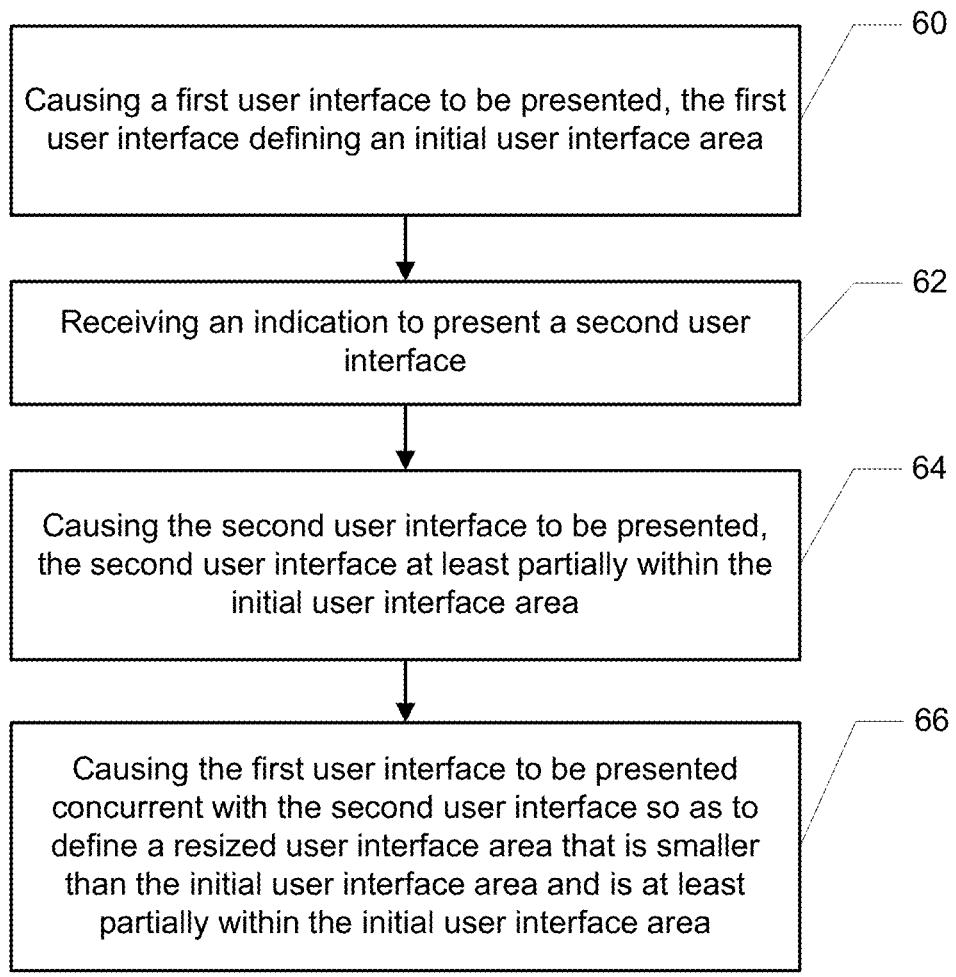

Having thus described example embodiments of the invention in general terms, reference will now be made to the accompanying drawings, which are not necessarily drawn to scale, and wherein:

FIG. 1 is a schematic representation of a system including first and second electronic devices and a network entity, such as a server, that may support example embodiments of the present invention;

FIG. 2 is a block diagram of an electronic device that may be configured to implement example embodiments of the present invention;

FIG. 3 is a block diagram of an apparatus that may be embodied by or associated with an electronic device, and may be configured to implement example embodiments of the present invention;

FIG. 4 is a flowchart illustrating the operations performed in accordance with one embodiment of the present invention; and FIGS. 5-10 illustrate functionality provided in accordance with example embodiments of the present invention in order to permit multitasking with multiple devices, applications, and views of an application.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, processed and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As described below, a method, apparatus and computer program product are provided for intuitive multitasking with multiple devices, applications, or views of an application. In this regard, the method, apparatus and computer program product of an example embodiment may permit a user to multitask with multiple devices, applications, or views of an application in an intuitive, convenient, and efficient manner. Indeed, the method, apparatus and computer program product of one embodiment may allow a user to multitask with multiple devices, applications, or views of an application without diverting their attention from whichever device, application, or view they are presently using by causing first and second user interfaces to be presented concurrently, the first interface being associated with a first device, a first application, or a first view of a single application and the second interface being associated with a second device, a second application, or a second view of the single application.

In one embodiment, a user device may be configured to not only present the first and second user interfaces, but also to control, respectively, the first and second devices, applications, or views of a single application with user input received via the first and second user interfaces. In yet another embodiment, the user device may be configured to receive user input requesting to transfer content from the first device, the first application, or the first view of the single application to the second device, the second application, or the second view of the single application and to thereby permit the second device, application or view to access the content. This functionality can also work in reverse, to transfer content from the second device, application, or view to the first device, application, or view in a similar manner. FIG. 1 illustrates a block diagram of a system for presenting the first and second user interfaces associated with the first and second devices, applications, or views, for controlling the first and second devices, applications, or views through the first and second user interfaces, and for transferring content between the first and second devices, applications, or views. While FIG. 1 illustrates one example of a configuration of a system for implementing this functionality, numerous other configurations may be used to implement embodiments of the present invention.

With reference to FIG. 1, however, the system may include a first user device 10, a second user device 11, and a network entity 12, such as a server or other computing device, that are configured to communicate over a network 14. The user devices 10 and 11 may be any device that is configured to be controlled via a user interface. For example, user devices 10 and 11 may be mobile terminals, such as mobile telephones, PDAs, pagers, laptop computers, tablet computers, or any of numerous other hand held or portable communication devices, computation devices, content generation devices, content consumption devices, or combinations. User devices 10 and 11 and network entity 12 may include or be associated with an apparatus 45, such as shown in FIG. 3, configured in accordance with embodiments of the present invention, as described below. In certain other embodiments, only one of the user devices 10 or 11 may be present. In certain embodiments, user devices 10 and 11 may be configured to utilize an operating system for performing operations such as managing device resources, providing services for applications, and the like. User devices 10 and 11 may, in certain embodiments, utilize the same operating system or different operating systems.

The network entity 12 may be a server or other network-accessible device that may access and/or be accessed by one or both of user devices 10 and 11. In one embodiment, the network entity 12 includes or is associated with an apparatus 45, such as shown in FIG. 3, configured in accordance with embodiments of the present invention, as described below. In one embodiment, user devices 10 and 11 may communicate directly with one another via, for example, BLUETOOTH, WI-FI, or the like. In another embodiment, user devices 10 and 11 may communicate with one another through the network 14. In this regard, the network may be any of various types of networks, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network. In regards to transferring content between user devices 10 and 11, in one embodiment the devices may store the content to be transferred locally, such as in the memory device 56 depicted in FIG. 3, and thus the content will be transferred directly from user device 10 to user device 11, or vice versa. However, in another embodiment the content may be stored by the network entity 12, such as in a memory device 56 depicted in FIG. 3, and thus the content is transferred from the network entity 12 to the destination user device 10 or 11.

In one embodiment, one or both of the user devices 1, 11 may be embodied by a mobile terminal. In this regard, a block diagram of a mobile terminal 15 that would benefit from embodiments of the present invention is illustrated in FIG. 2. It should be understood, however, that the mobile terminal 15 as illustrated and hereinafter described is merely illustrative of one type of user device that may benefit from embodiments of the present invention and, therefore, should not be taken to limit the scope of embodiments of the present invention. As such, although numerous types of mobile terminals, such as PDAs, mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, may readily employ embodiments of the present invention, other user devices including fixed (non-mobile) electronic devices may also employ some example embodiments.

The mobile terminal 15 may include an antenna 16 (or multiple antennas) in operable communication with a transmitter 18 and a receiver 20. The mobile terminal 15 may further include an apparatus, such as a processor 22 or other processing device (e.g., processor 50 of the apparatus of FIG. 3), which controls the provision of signals to and the receipt of signals from the transmitter 18 and receiver 20, respectively. The signals may include signaling information in accordance with the air interface standard of the applicable cellular system, and also user speech, received data and/or user generated data. In this regard, the mobile terminal 15 is capable of operating with one or more air interface standards, communication protocols, modulation types, and access types. By way of illustration, the mobile terminal 15 is capable of operating in accordance with any of a number of first, second, third and/or fourth-generation communication protocols or the like. For example, the mobile terminal 15 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 15 may be capable of operating in accordance with non-cellular communication mechanisms. For example, the mobile terminal 15 may be capable of communication in a wireless local area network (WLAN) or other communication networks.

In some embodiments, the processor 22 may include circuitry desirable for implementing audio and logic functions of the mobile terminal 15. For example, the processor 22 may be comprised of a digital signal processor device, a microprocessor device, and various analog to digital converters, digital to analog converters, and other support circuits. Control and signal processing functions of the mobile terminal 15 are allocated between these devices according to their respective capabilities. The processor 22 thus may also include the functionality to convolutionally encode and interleave message and data prior to modulation and transmission. The processor 22 may additionally include an internal voice coder, and may include an internal data modem. Further, the processor 22 may include functionality to operate one or more software programs, which may be stored in memory. For example, the processor 22 may be capable of operating a connectivity program, such as a conventional Web browser. The connectivity program may then allow the mobile terminal 15 to transmit and receive Web content, such as location-based content and/or other web page content, according to a Wireless Application Protocol (WAP), Hypertext Transfer Protocol (HTTP) and/or the like, for example.

The mobile terminal 15 may also comprise a user interface including an output device such as a conventional earphone or speaker 26, a ringer 24, a microphone 28, a display 30, and a user input interface, all of which are coupled to the processor 22. The user input interface, which allows the mobile terminal 15 to receive data, may include any of a number of devices allowing the mobile terminal 15 to receive data, such as a keypad 32, a touch screen display (display 30 providing an example of such a touch screen display) or other input device. In embodiments including the keypad 32, the keypad 32 may include the conventional numeric (0-9) and related keys (#, *), and other hard and soft keys used for operating the mobile terminal 15. Alternatively or additionally, the keypad 32 may include a conventional QWERTY keypad arrangement. The keypad 32 may also include various soft keys with associated functions. In addition, or alternatively, the mobile terminal 15 may include an interface device such as a joystick or other user input interface. Some embodiments employing a touch screen display, as described further below, may omit the keypad 32 and any or all of the speaker 26, ringer 24, and microphone 28 entirely. The mobile terminal 15 further includes a battery, such as a vibrating battery pack, for powering various circuits that are required to operate the mobile terminal 15, as well as optionally providing mechanical vibration as a detectable output.

The mobile terminal 15 may further include a user identity module (UIM) 34. The UIM 34 is typically a memory device having a processor built in. The UIM 34 may include, for example, a subscriber identity module (SIM), a universal integrated circuit card (UICC), a universal subscriber identity module (USIM), a removable user identity module (R-UIM), etc. The UIM 34 typically stores information elements related to a mobile subscriber. In addition to the UIM 34, the mobile terminal 15 may be equipped with memory. For example, the mobile terminal 15 may include volatile memory 36, such as volatile Random Access Memory (RAM) including a cache area for the temporary storage of data. The mobile terminal 15 may also include other non-volatile memory 38, which may be embedded and/or may be removable. The memories may store any of a number of pieces of information, and data, used by the mobile terminal 15 to implement the functions of the mobile terminal 15.

An example embodiment of the invention will now be described with reference to FIG. 3, in which certain elements of an apparatus 45 for multitasking with multiple devices, multiple applications, and multiple views of an application are depicted. The apparatus 45 of FIG. 3 may be employed, for example, in conjunction with either or both of the user devices 10 and 11 of FIG. 1, such as with the mobile terminal 15 of FIG. 2. However, it should be noted that the apparatus 45 of FIG. 3 may also be employed in connection with a variety of other devices, both mobile and fixed, and therefore, embodiments of the present invention should not be limited to application on devices such as the mobile terminal 15 of FIG. 2. For example, the apparatus 45 may be embodied by or associated with a personal computer or other user terminal. Moreover, in some cases, the apparatus 45 may be embodied by or associated with a fixed device such as a network entity 12, e.g., a server or other service platform, and the user interfaces may be presented (e.g., via a server/client relationship) on a remote device such as the user device 10, e.g., the mobile terminal, based on processing that occurs at the fixed device.

It should also be noted that while FIG. 3 illustrates one example of a configuration of an apparatus 45 for multitasking with multiple devices, applications, or views of an application, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 3, the apparatus 45 for multitasking with multiple devices, applications, or views of an application may include or otherwise be in communication with a processor 50, a communication interface 54, and a memory device 56. As described below and as indicated by the dashed lines in FIG. 3, the apparatus 45 may also optionally include a user interface 52 in some embodiments, such as embodiments in which the apparatus 45 is embodied as a user device 10 or 11. In some embodiments, the processor 50 (and/or co-processors or any other processing circuitry assisting or otherwise associated with the processor 50) may be in communication with the memory device 56 via a bus for passing information among components of the apparatus 45. The memory device 56 may include, for example, one or more volatile and/or non-volatile memories. In other words, for example, the memory device 56 may be an electronic storage device (e.g., a computer readable storage medium) comprising gates configured to store data (e.g., bits) that may be retrievable by a machine (e.g., a computing device like the processor 50). In the embodiment in which the apparatus 45 is embodied as a mobile terminal 15, the memory device 56 may be embodied by the memory 36, 38. The memory device 56 may be configured to store information, data, content, applications, instructions, or the like, for enabling the apparatus to carry out various functions in accordance with an example embodiment of the present invention. For example, the memory device 56 could be configured to buffer input data for processing by the processor 50. Additionally or alternatively, the memory device 56 could be configured to store instructions for execution by the processor 50.

The apparatus 45 may, in some embodiments, be embodied by or associated with a user terminal (e.g., mobile terminal 15) or a fixed communication device or computing device (e.g., network entity 12) configured to employ an example embodiment of the present invention. However, in some embodiments, the apparatus 45 may be embodied as a chip or chip set. In other words, the apparatus 45 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 45 may therefore, in some cases, be configured to implement an embodiment of the present invention on a single chip or as a single "system on a chip." As such, in some cases, a chip or chipset may constitute means for performing one or more operations for providing the functionalities described herein.

The processor 50 may be embodied in a number of different ways. For example, the processor 50 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 50 may include one or more processing cores configured to perform independently. A multi-core processor may enable multiprocessing within a single physical package. Additionally or alternatively, the processor 50 may include one or more processors configured in tandem via the bus to enable independent execution of instructions, pipelining and/or multithreading. In the embodiment in which the apparatus 45 is embodied as a mobile terminal 15, the processor 50 may be embodied by the processor 22.

In an example embodiment, the processor 50 may be configured to execute instructions stored in the memory device 56 or otherwise accessible to the processor 50. Alternatively or additionally, the processor 50 may be configured to execute hard coded functionality. As such, whether configured by hardware or software methods, or by a combination thereof, the processor 50 may represent an entity (e.g., physically embodied in circuitry) capable of performing operations according to an embodiment of the present invention while configured accordingly. Thus, for example, when the processor 50 is embodied as an ASIC, FPGA or the like, the processor 50 may be specifically configured hardware for conducting the operations described herein. Alternatively, as another example, when the processor 50 is embodied as an executor of software instructions, the instructions may specifically configure the processor 50 to perform the algorithms and/or operations described herein when the instructions are executed. However, in some cases, the processor 50 may be a processor of a specific device (e.g., a mobile terminal or network entity) configured to employ an embodiment of the present invention by further configuration of the processor 50 by instructions for performing the algorithms and/or operations described herein. The processor 50 may include, among other things, a clock, an arithmetic logic unit (ALU) and logic gates configured to support operation of the processor 50.

Meanwhile, the communication interface 54 may be any means such as a device or circuitry embodied in either hardware or a combination of hardware and software that is configured to receive and/or transmit data from/to a network 14 and/or any other device or module in communication with the apparatus 45. In this regard, the communication interface 54 may include, for example, an antenna (or multiple antennas) and supporting hardware and/or software for enabling communications with a wireless communication network. Additionally or alternatively, the communication interface 54 may include the circuitry for interacting with the antenna(s) to cause transmission of signals via the antenna(s) or to handle receipt of signals received via the antenna(s). In some environments, the communication interface 54 may alternatively or also support wired communication. As such, for example, the communication interface 54 may include a communication modem and/or other hardware/software for supporting communication via cable, digital subscriber line (DSL), universal serial bus (USB) or other mechanisms. In the embodiment in which the apparatus 45 is embodied as a mobile terminal 15, the communication interface 54 may be embodied by the antenna 16, transmitter 18, receiver 20 or the like.

In some embodiments, such as instances in which the apparatus 45 is embodied by a user device 10 or 11, the apparatus 45 may include a user interface 52 that may, in turn, be in communication with the processor 50 to receive an indication of a user input and/or to cause provision of an audible, visual, mechanical or other output to the user. As such, the user interface 52 may include, for example, a keyboard, a mouse, a joystick, a display, a touch screen(s), touch areas, soft keys, a microphone, a speaker, or other input/output mechanisms. Alternatively or additionally, the processor 50 may comprise user interface circuitry configured to control at least some functions of one or more user interface elements such as, for example, a speaker, ringer, microphone, display, and/or the like. The processor 50 and/or user interface circuitry comprising the processor 50 may be configured to control one or more functions of one or more user interface elements through computer program instructions (e.g., software and/or firmware) stored on a memory accessible to the processor 50 (e.g., memory device 56, and/or the like). In other embodiments, however, such as in instances in which the apparatus 45 is embodied by a network entity 12, the apparatus 45 may not include a user interface 52.

Before proceeding, it should be understood that although device 10 will be referred to as the first device and device 11 will be referred to as the second device hereinafter, this is only for the sake of clarity and brevity of description. Any of devices 10 or 11, or network entity 14, may function as the first or second device in accordance with various embodiments of the present invention. It should also be noted that user interaction is indicated in FIGS. 5-8 by circular symbols. A circular symbol connected to an arrow thus indicates a selection and subsequent dragging motion in the direction of the arrow. The arrows connecting the various numbered views indicate the order of progression between numbered views as a result of any depicted event or user interaction.

Referring now to FIG. 4, the operations for multitasking with multiple devices, applications, or views of an application are depicted. In this regard and as described below, the operations of FIG. 4 may be performed by an apparatus 45, such as shown in FIG. 3, and, in one embodiment, by a first user device 10, such as a mobile terminal 15, such as depicted in FIG. 2. In this regard, the apparatus 45 may include means, such as the user interface 52, the processor 50, the communication interface 54 or the like, for causing a first user interface to be presented. See operation 60. As depicted in view 100 of FIG. 5, and as described in operation 60 of FIG. 4, the first user interface 71 defines an initial user interface area 70 and, in some embodiments, may initially extend from a first edge 75 to a second edge 77. In the illustrated embodiment, the first 75 and second 77 edges are coincident with the opposed edges of the display. However, the first 75 and second 77 edges may be spaced from the edges of the display in other embodiments. This first user interface 71 may be associated with a first device, such as the first user device 10 depicted in FIG. 1. The association of the first user interface 71 with the first device 10 may permit the screen that is or would have been presented upon the display of the first device 10 to be presented within the first user interface 71. For example, the first user interface may permit applications available for access by the first device 10 to be presented via the first user interface 71, such as the email application depicted in view 100.

With reference to operation 62 of FIG. 4, the apparatus 45 of FIG. 3 may also include means, such as a processor 50, the user interface 52, the communication interface 54 or the like, for receiving an indication to present a second user interface. In certain embodiments receiving the indication may comprise, for example, receiving user input or receiving the indication from the first or second device. As depicted in view 100 of FIG. 5, the user input may, for example, comprise a user selecting the first user interface 71, such as along the first edge 75, and dragging or "swiping" towards the second edge 77. However, the apparatus may be configured to receive and respond to other types of user input that indicates that a second user interface is to be presented, such as, for example, the user selecting or pressing a dedicated soft key or physical button.

Figure 7:
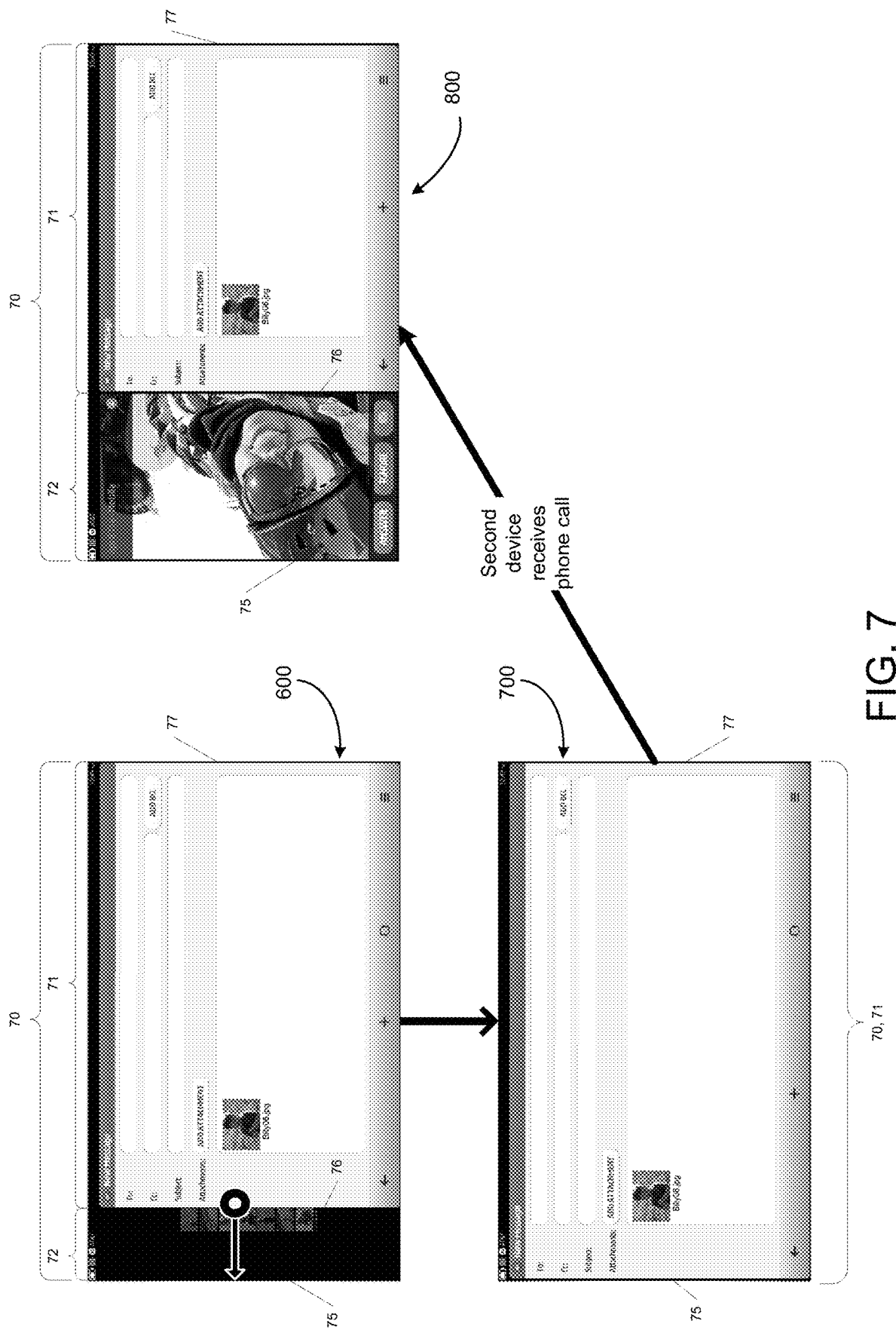

As depicted in views 700 and 800 of FIG. 7, receiving the indication from the first or second device may, for example, comprise receiving an indication that the second device 11 is receiving a phone call, in an instance in which the second device 11 is a mobile telephone or the like. The indication may also or alternatively be triggered by the occurrence of any number of other events, such as the second device 11 receiving a Short Message Service (SMS) or Multimedia Messaging Service (MMS) message, the second device 11 receiving an e-mail, an alarm being activated on the second device, a request by an application running on the second device 11, or the occurrence of any other event related to the second device 11. The indication may also be received from the first device 10 and may be triggered by the occurrence of any event related to the first device 10, such as those described above in conjunction with the second device 11.

As shown in operation 64 of FIG. 4, the apparatus 45 of FIG. 3 may also include means, such as a processor 50, the user interface 52, the communication interface 54 or the like, for causing the second user interface 72 associated with the second device to be presented. As depicted in view 300 of FIG. 5, and as described in operation 60 of FIG. 4, the second user interface 72 is at least partially and, in one embodiment, entirely, within the initial user interface area 70. This second user interface 72 is associated with a second device, such as device 11 depicted in FIG. 1. As with the first user interface 71, the association of the second user interface 72 with the second device 11 may permit the screen that is or would have been presented upon the display of the second device 11 to be presented within the second user interface 72. For example, the second user interface may permit applications available for access by the second device 10 to be presented via the second user interface 72, such as the photo application depicted in view 400.

Figure 10:
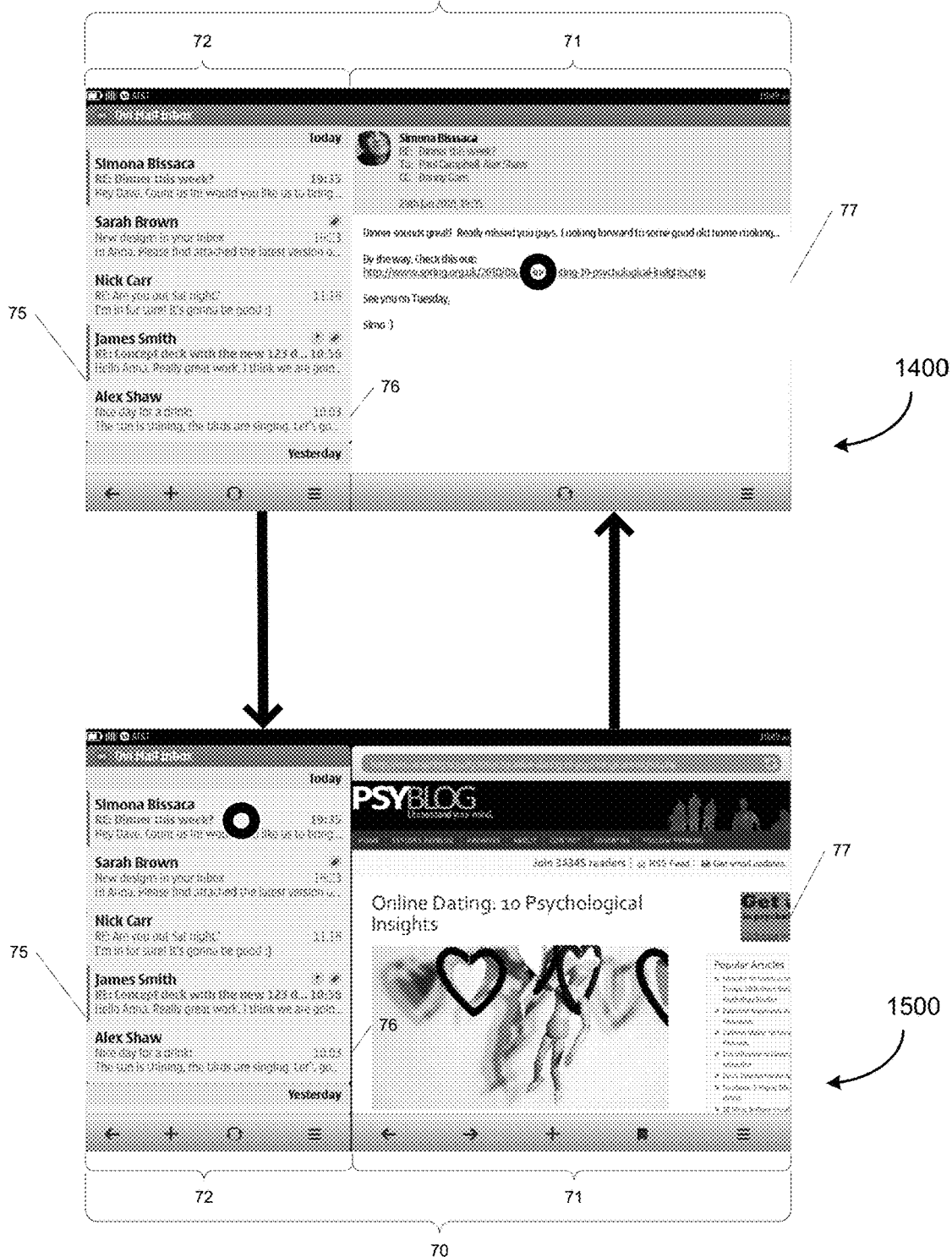

Referring now to FIG. 10, the first 71 and/or second 72 user interfaces may also be associated with a respective first or second application. The association of the first user interface 71 with a first application may permit the first application to be presented via the first user interface 71, while the association of the second user interface 72 with a second application may permit the second application to be presented via the second user interface 72. For example, as depicted in view 1500, user interface 71 may be associated with a browser application, while the second user interface 72 is associated with an email application. In other embodiments, the first 71 and/or second 72 user interfaces may also be associated with a respective view of an application. The association of the first user interface 71 with a first view of an application may permit a first view of the application to be presented via the first user interface, while the association of the second user interface 72 with a second view of the application may permit the second view of the application to be presented via the second user interface. Each view of a single application may contain alternate and/or additional functionality related to the application. For example, as depicted in view 1400, the first user interface 71 may be associated with a message reading view of an email application, while the second user interface 72 may be associated with a message list view of the email application. Multiple views of a single application may, for example, be implemented as separate sub-applications, as multiple instances of the single application, or in various other ways. The features and/or functionality contained in each view may, for example, be programmed into each application. In certain other embodiments, the operating system may determine which features and/or functionality are contained in each view. In other embodiments, the features and/or functionality contained in each view may be configurable by a user. Any single application may have any number of alternate views.

As shown, the first 71 and second 72 user interfaces are shown concurrently on the same display, such as on the display of the first user device 10. The first user interface 71 is generally reduced in size relative to its initial display size to accommodate the second user interface 72. As shown, the display may be split unevenly between the first 71 and second 72 user interfaces. However, the display may be split equally or in any proportion, such as may be predefined or based on user input.

It should be understood that the association between the first user interface 71 and first device 10 and the association between the second user interface 72 and second device 11 may be initiated in a number of ways. For example, a user may initiate association by manually "pairing" apparatus 45 with the first and second devices 10 and 11. In another embodiment, the pairing may be automatically initiated when the first and second devices 10 and 11 are in range of the apparatus 45. In certain embodiments, one of the first device 10 or second device 11 may embody the apparatus 45 and thus the manual or automatic pairing may only need to be initiated between the first device 10 and the second device 11. Once the association has been initiated, data may be communicated between the paired devices, such as in instances in which the first 10 and second 11 devices are in proximity to one another or are otherwise in communication with one another, via direct communications between the user devices 10 and 11, via network-based communication means or the like. See FIG. 1.

Reference will now be made to FIGS. 5-9, and associated views 100-1300, in order to describe additional functionality provided in accordance with various embodiments of the present invention.

Figure 5:
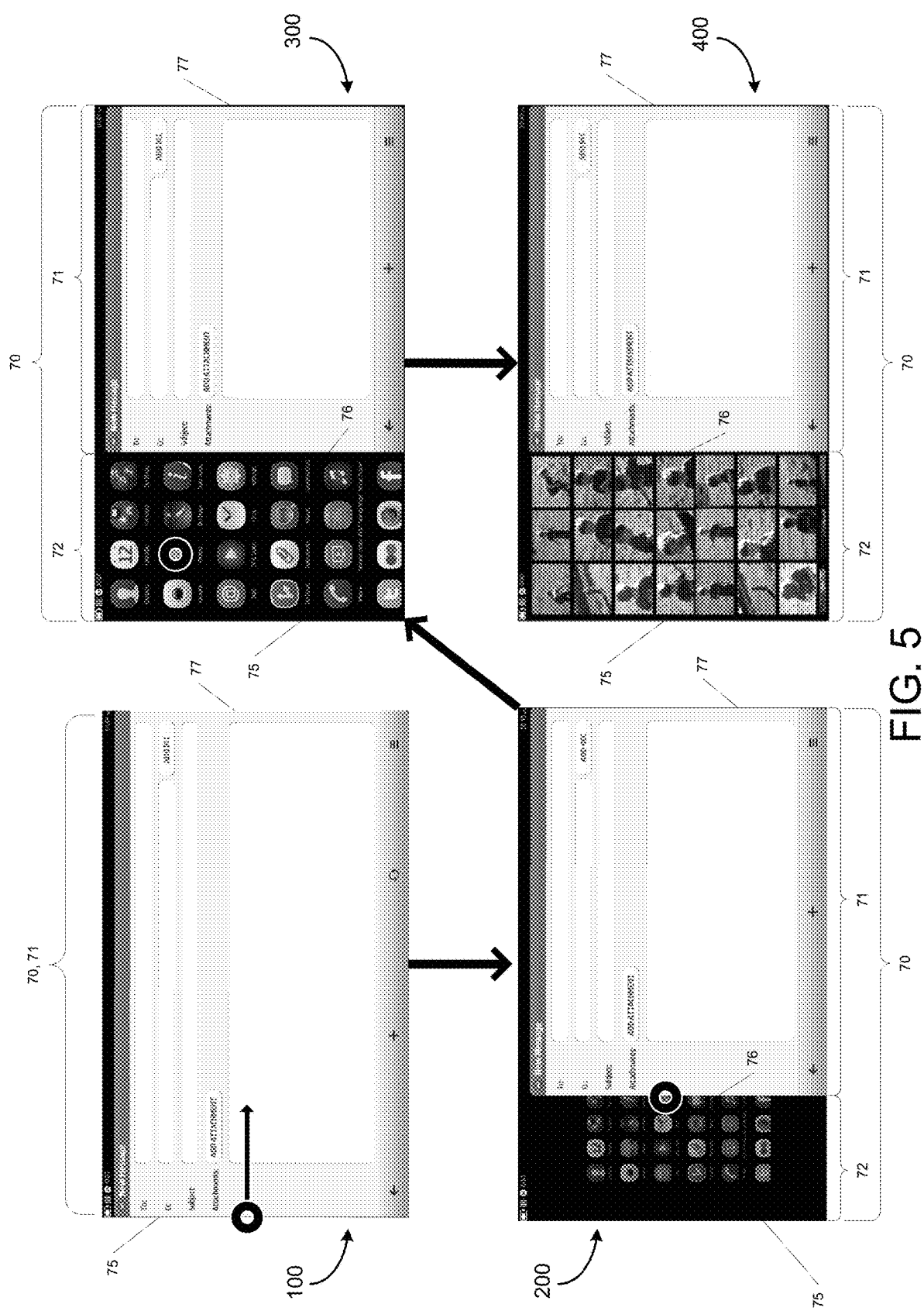
Figure 6:
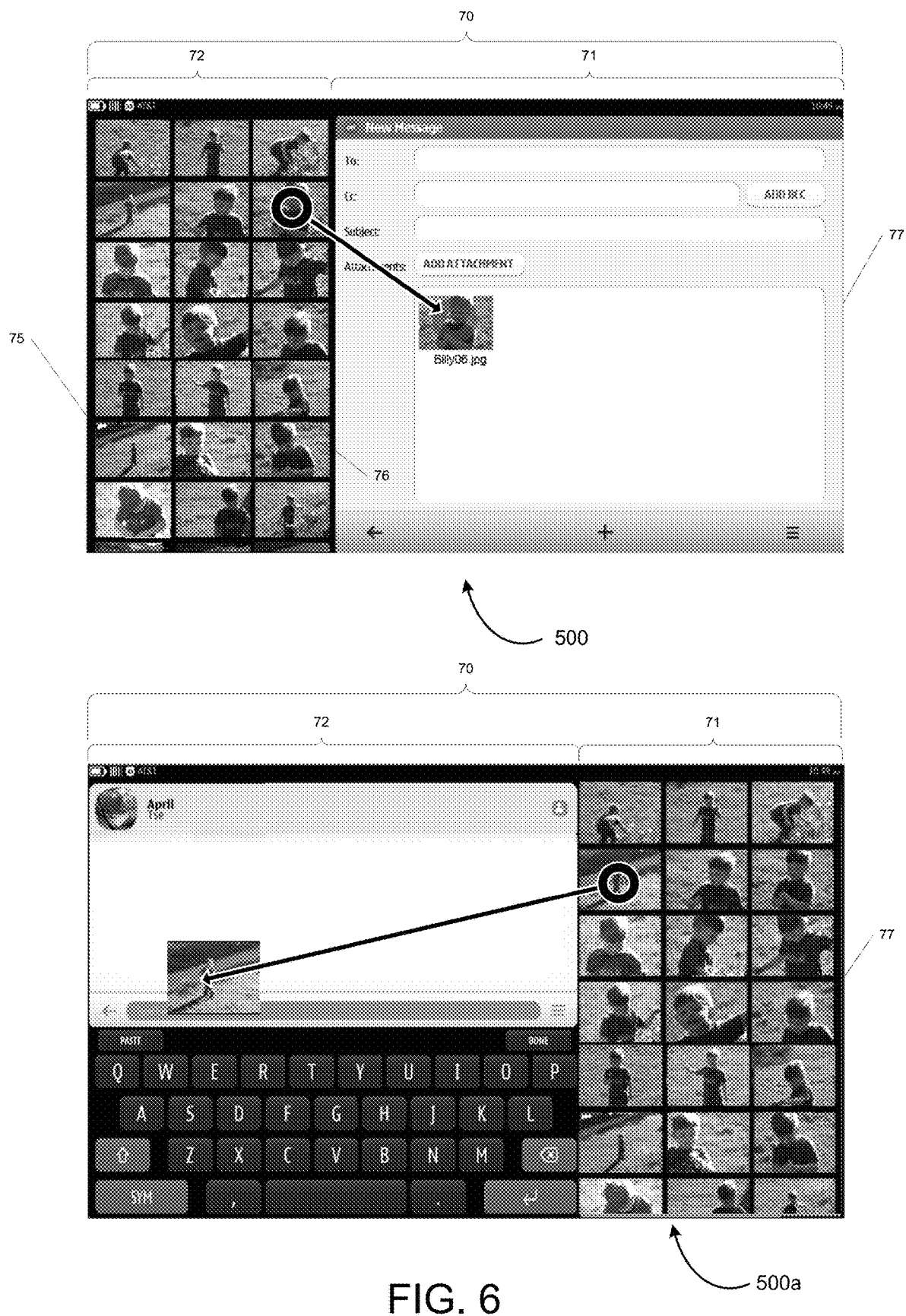
Figure 8:
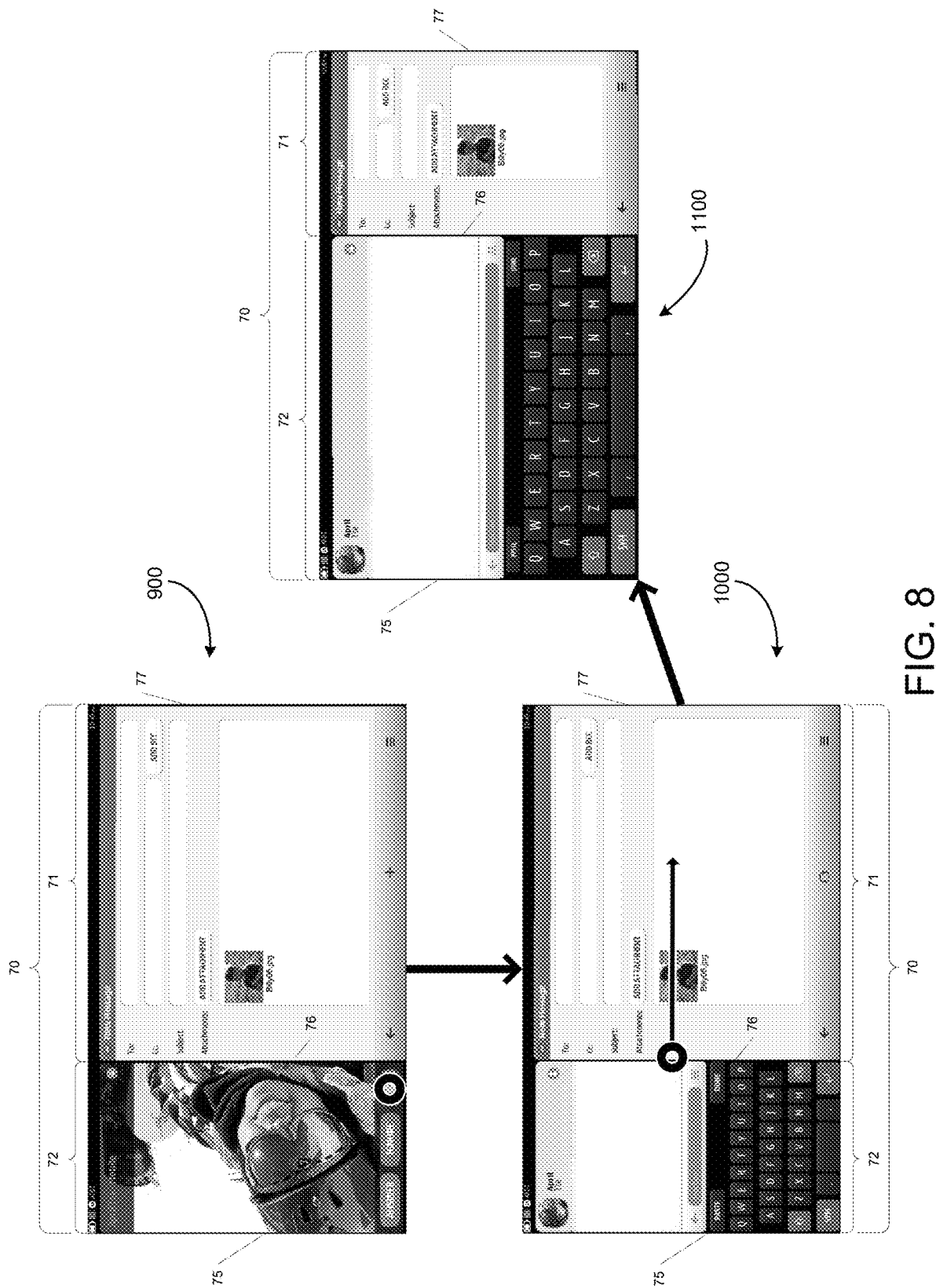

As depicted, for example, in views 300 and 400 of FIG. 5, and view 500 of FIG. 6, the apparatus 45 of FIG. 3 may also include means, such as a processor 50, the user interface 52, the communication interface 54 or the like, for receiving input via the first user interface 71, controlling the first device 10 with the user input received via the first user interface 71, receiving user input via the second user interface 72, and controlling the second device 11 with the user input received via the second user interface 72, regardless of which device presents the first 71 and second 72 user interfaces. View 300, for example, depicts a user controlling the second device 11 by selecting a photo application available for access by the second device 11 via the second user interface 72. Selecting the photo application causes it to be launched and presented via the second user interface 72, as shown in view 400. View 900 of FIG. 8 depicts a user using the second user interface 72 to reject a phone call received by the second device 11 with a message. In one embodiment, the apparatus 45 may be embodied in a device, such as the mobile terminal 15 of FIG. 2, comprising a speaker 26 and microphone 28, such that the user could have just as easily accepted the phone call and used the mobile terminal 15 to talk to the caller instead of the second device 11. View 500 of FIG. 5 depicts a user controlling the first device 10 via the first user interface 71 by dragging a photo from the second user interface 72 to attach to an email being composed in an email application presented via the first user interface 71. Thus, according to one embodiment of the present invention, the user can multitask with the first and second devices 10 and 11 as if the devices were a single device. For example, the first device 10 may comprise a display 30, as depicted in FIG. 3, and the apparatus 45 may be configured to cause the first and second user interfaces to be presented by the display. In this way, a user may control both the first device 10 and the second device 11 using only the first device 10.

In an instance in which the first and/or second user interfaces are associated with a first or second application or view of an application, as depicted, for example, in views 1400 and 1500 of FIG. 10, the apparatus 45 of FIG. 3 may also include means, such as a processor 50, the user interface 52, the communication interface 54 or the like, for receiving input via the first user interface 71, controlling the first application or the first view of the single application with the user input received via the first user interface 71, receiving user input via the second user interface 72, and controlling the second application or the second view of the single application with the user input received via the second user interface 72. View 1400, for example, depicts a user controlling a message reading view of an email application by selecting a hyperlink contained in an email. Selecting the hyperlink within the first user interface 71, as depicted in view 1400, may cause the browser application to be presented via the first user interface 71 in order to display the website to which the hyperlink points, as depicted in view 1500. As depicted in view 1500, the user may then replace the browser application being presented in the first user interface 71 with the message reading view by, for example, selecting, via the second user interface 72, a message that the user wishes to read, thus returning to the state depicted in view 1400. Certain embodiments may also permit the user to dismiss the browser application and represent the message reading view via the first user interface 71 by, for example, swiping the first user interface towards the first or second edge.

In an instance in which the first device 10 is being used to control both the first 10 and second 11 devices, the second 72 user interfaces can be presented, and the second device controlled, in a variety of different ways. For example, certain embodiments may use a Virtual Network Computing (VNC) system and associated protocols, such as remote framebuffer (RFB), to communicate user interface data and user input data between the first 71 and second 72 devices. In other embodiments, the second device 11 may transmit drawing commands to the first device 10. The first device 10 may then render and present the second user interface 72 based on the drawing commands received from the second device 11. In yet another embodiment, the second user interface 72 is rendered independently by the first device 10. Thus, for example, in an instance in which a music player application accessible by the second device 11 is being presented via the second user interface 11, graphical content such as, for example, the buttons for controlling the player, may be stored in or otherwise accessible by the first device. The first device 10 would thus render the graphical user interface for the music player and present it within the second user interface 11, without any of the graphical content needing to be transmitted from the second device 11 to the first device 10. In this way, it may only be necessary for the content (music files in this example) to be transmitted to the first device 10. When a user controls the music player via the second user interface 72 by, for example, selecting to skip to the next song, the first device 10 may transmit a request to receive the next song from the second device 11.

As depicted in views 500 and 500a of FIG. 6, the apparatus 45 of FIG. 3 may also include means, such as a processor 50, the user interface 52, the communication interface 54 or the like, for transferring content between the first device 10 and the second device 11. The apparatus may be configured to receive user input requesting to transfer content to one of the first 10 or second 11 devices. The user input may be received, for instance, via the first 71 or second 72 user interfaces. For example, as shown in views 500 and 500a, the user input may comprise a user selecting and dragging a piece of content, such as a photo, from one user interface to the other. In response to the user input, the apparatus 45 would then permit the device to which the content was requested to be transferred ("destination device") to access the content and, in some embodiments, to copy and store the content. In certain embodiments, the apparatus 45 may also cause a representation of the content to be presented via the user interface associated with the destination device, thereby depicting the availability of the content at the destination device. The content may be any type of content available to one of the devices. For example, the content may be a photo, as depicted in views 500 and 500a. The content could also be music, videos, or any other type of media. The content could also be an executable application, a document, or any other type of file or data. In some cases the content may also be text or a link to a webpage. In some embodiments the content may reside locally, such as being stored in a memory of one of the devices. In other embodiments, the content may reside remotely, such as being stored in a memory of a network entity 12, such as a server. Permitting the destination device to access the content may be accomplished by causing the content to be copied or transferred to the destination device, or by simply permitting the destination device to remotely access the content.

Content may be similarly transferred between a first and second application or a first and second view of an application. For example, referring to views 500, the photo application and email application may both be stored or accessible by a single device, such that the first 71 and second 72 user interfaces are associated with a respective first (email) and second (photo) application instead of a first 10 and second 11 device. In this way, the apparatus may be configured to receive user input requesting to transfer content to one of the first 10 or second 11 applications. The user input may be received, for instance, via the first 71 or second 72 user interfaces. For example, as shown in views 500 and 500a, the user input may comprise a user selecting and dragging a piece of content, such as a photo, from one user interface to the other. In response to the user input, the apparatus 45 would then permit the application to which the content was requested to be transferred ("destination application") to access the content. In certain embodiments, the apparatus 45 may also cause a representation of the content to be presented via the user interface associated with the destination application, thereby depicting the availability of the content within the destination application. Content may be transferred between a first and second view of an application in a similar manner in an instance in which the first 71 and second 72 user interfaces are associated with respective first and second views of a single application.

Referring to FIGS. 5-9, the first user interface 71 and second user interface 72 may, in one embodiment, abut at a transitional edge 76 located between the first 75 and second 77 edges in an instance in which the first 71 and second 72 user interface are displayed concurrently. In this way, the transitional edge 76 defines the line along which the initial user interface area 70 transitions from the first user interface 71 to the second user interface 72. In certain embodiments the location of the transitional edge 76 may even be defined through user input. As an example of a type of user input suitable for defining the location of the transitional edge 76, view 100 depicts a user selecting the first edge 75, dragging towards the second edge 77, and releasing the selection. The location of the transitional edge 76 would then be defined based on where the user released the selection, as depicted in view 200. The location of the transitional edge 76 may also be continually updated throughout the user's dragging motion, giving the user the sensation of sliding the first user interface 71 aside as if it were a curtain, thereby revealing the second user interface 72 as if it were behind the first user interface. The user may also subsequently relocate the transitional edge 76, by moving the transitional edge 76 closer to the first edge 75, as depicted in view 600 of FIG. 7, or closer to the second edge 77, as depicted in views 1000 and 1100 of FIG. 8. The user can also move the transitional edge 76 all the way to the first edge 75 or the second edge 77. As depicted in views 600 and 700 of FIG. 7, moving the transitional edge 76 all the way to the first edge 75 would cause the first user interface 71 to expand to fill the entire initial user interface area 70. Similarly, moving the transitional edge 76 all the way to the second edge 77 would cause the second user interface 72 to fill the entire initial user interface area 70. In some embodiments, an application being presented in the first 71 or second 72 user interfaces may provide additional functionality or features when the user interface it is being presented in is expanded by the user.

Certain embodiments may limit the possible locations of the transitional edge 76 in order to account for one or more rendering capabilities. The one or more rendering capabilities may include, for example, the native resolutions of the first 10 or second 11 devices, or a capability of an application or application view being presented within the first 71 or second 72 user interfaces. For example, the apparatus 45 of FIG. 3 may also include means, such as a processor 50, for determining one or more permitted locations for the transitional edge 76 based on one or more rendering capabilities. Thus, in an instance in which the transitional edge 76 is not located at one of the permitted locations, the apparatus 45, such as the processor 50, may change the location of the transitional edge 76 to one of the permitted locations. The apparatus 45, such as the processor 50, may, for example, move the location of the transitional edge 76 to the nearest permitted location. In this way, the permitted locations may, for example, act as one or more virtual detents, which cause the transitional edge 76 to "snap" into place, ensuring proper proportionality between the first 71 and second 72 user interfaces. In one exemplary embodiment, in which the first device 10 is a mobile terminal 15 with a high native resolution such as, for instance, a tablet computer, and the second device 11 is a mobile terminal 15 with a smaller native resolution such as a mobile phone, the permitted locations may be located ⅓ and ⅔ of the way between the first 75 and second 77 edges. The permitted locations may also be based on a capability of an application being presented within the first 71 or second 72 user interfaces. For example, if an application being presented within the second user interface 72 is not capable of being displayed in a full screen mode, such that it would fill the entire initial user interface area 70, the second edge 77 would not be a permitted location for the transitional edge 76.

Figure 9:
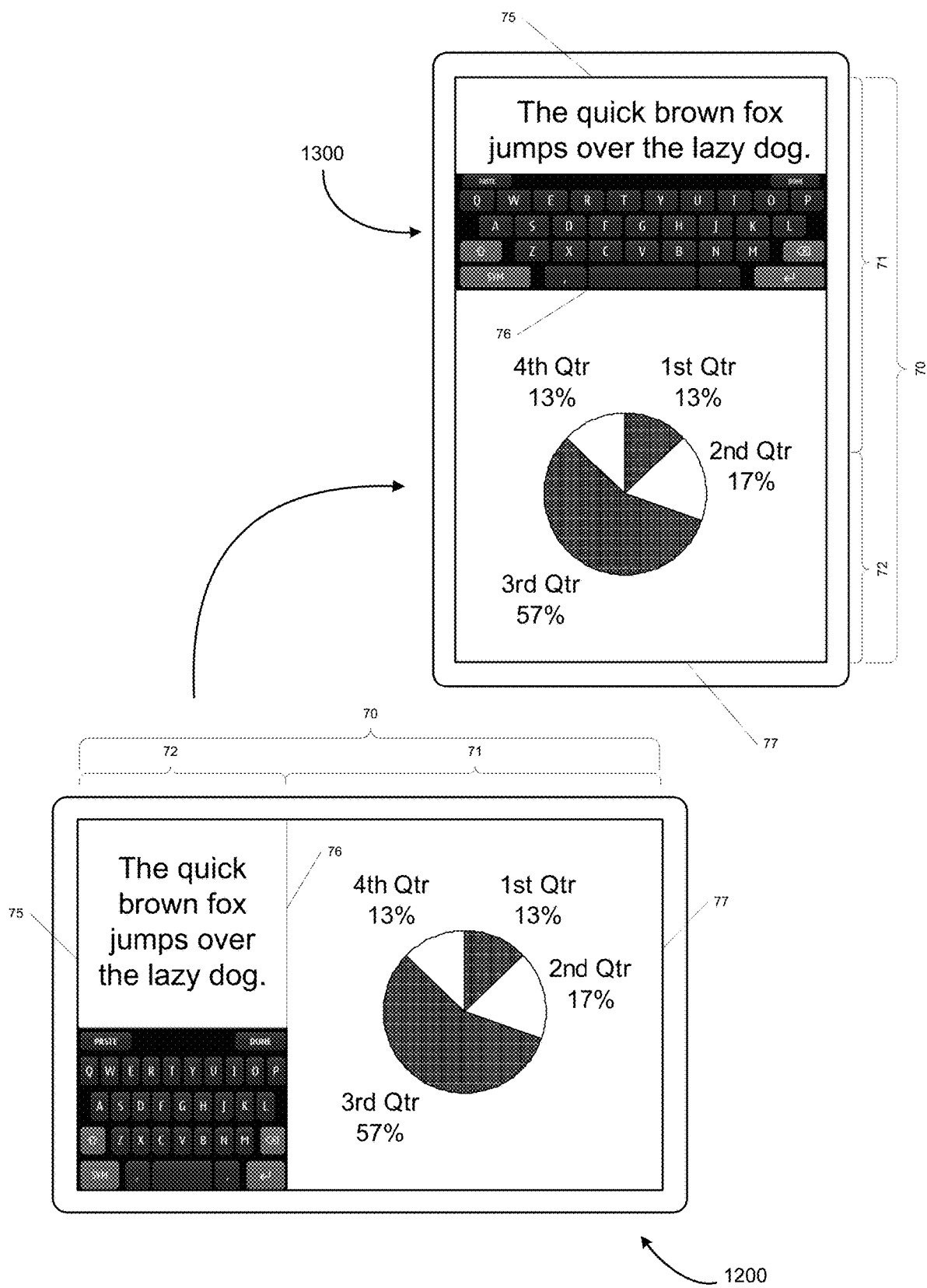

Referring to FIG. 9, certain embodiments of the invention may account for the orientation of a display on which the first 71 and second 72 user interfaces are presented. For example, in one embodiment the first device may comprise a display and the apparatus 45 of FIG. 3. The apparatus 45 may include means, such as a processor 50, for receiving an indication of a change in orientation of the first device 71. The indication may be generated by any suitable orientation or motion sensor. In response to receiving the indication of a change in orientation of the first device, the apparatus 45 may cause the orientation of the first 71 and/or second 72 user interfaces to be modified. Thus, as depicted in view 1200, the first user interface 71 may initially be presented in a landscape (horizontal) orientation, while the second user interface 72 is presented in a portrait (vertical) orientation. If the user then rotates the display on which the first 71 and second 72 user interfaces are being presented, as depicted in view 1300, the first user interface may be caused to assume a portrait (vertical) orientation, and the second user interface may be caused to assume a landscape (horizontal) orientation. As with the automatic adjustment of the location of the transitional edge 76, the adjustment of the orientation of the first 71 and second 72 user interfaces may also take into account a capability of an application being presented within the first 71 or second 72 user interface. For example, if an application being presented within the first 71 or second 72 user interface is not capable of being displayed in a landscape (horizontal) orientation or a portrait (vertical) orientation, the orientation of the first 71 and/or second 72 user interface may be appropriately set, regardless of the orientation of the display on which the first 71 and second 72 user interfaces are presented.

It will be understood that the first 71 and second interfaces 72 may be associated with devices, applications and views in any conceivable combination. Thus, the invention is not in any way limited to scenarios in which the first 71 and second 72 user interfaces are associated with a respective first 10 and second 11 device, a respective first and second application, or a respective first and second view of an application. Instead, the first 71 and second 72 user interfaces may be associated with all possible combinations of devices, applications and views. Thus, the first user interface 71 may, for example, be associated with the second device while the second user interface is associated with a first view of an application. Likewise, both the first 71 and second 72 user interfaces may, for example, be associated with the first device 10 or both may be associated with the second device 11. It will also be understood that the invention may be capable of transitioning between all possible association combinations. For example, as depicted in views 1400 and 1500 of FIG. 10, transitioning from a state in which the first 71 and second 72 user interfaces are associated with a first and second view of a single application to a state in which the first user interface 71 is still associated with the first view, but the second user interface 72 is instead associated with a second application. In this regard, the apparatus 45 may include means, such as a processor 50, for receiving an indication to change the association of one or more of the user interfaces. Receiving the indication may comprise, for example, receiving user input, or receiving the indication from the first or second devices. The apparatus 45 may also include means, such as a processor 50, for changing the association of one or more of the user interfaces.

As described above, FIG. 4 illustrates a flowchart of an apparatus 45, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 56 of an apparatus 45 employing an embodiment of the present invention and executed by a processor 50 of the apparatus 45. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included. Modifications, additions, or enhancements to the operations above may be performed in any order and in any combination.

The method, apparatus 45 and computer program product may be utilized in various scenarios. For example, a user may be using a tablet device with a touchscreen display when the user's phone rings nearby. The user may then swipe the user interface of the tablet, causing it to fill ⅔ of the display, allowing the user interface of the ringing phone to be presented on the remaining ⅓ of the tablet's display. Now the user may pick up the call or dismiss it, etc. from the display of the tablet device. In another example, the user interface of the phone may be ⅔ of the display and the user may compose a message. If the user has a photo saved in or accessible by the tablet, the user may use the ⅓ of the display corresponding to the tablet user interface and search for the photo saved in or accessible by the tablet. Once the photo is located, the user may drag it to the message that is being composed and the photo will be attached to the message even though the message is sent from the phone.

Other examples of use cases are that the user may work on the tablet user interface and have the phone user interface visible in order to control a music player on the phone, thereby causing music to be played through the speakers of the tablet. If the user has the whole display reserved for the tablet and there is an alert on the phone, the user may swipe the user interface to see the user interface of the phone then swipe the user interface of the tablet to full mode again. In some scenarios, following a link to a webpage may not be desirable on the small phone user interface, in which case the user could drag the link to the tablet user interface and open the link there. After that the user may want to dismiss the phone user interface by swiping it away. In yet another scenario, a user may be using a tablet computer while on vacation and have the whole display reserved for the tablet. If the user wishes to access their home personal computer, the user may swipe the user interface of the tablet to reveal the desktop of their home computer. The user may then access files, check email, or otherwise control their home computer over the internet using their tablet computer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory storing program code instructions therein, the at least one memory and program code instructions being configured to, with the at least one processor, cause the apparatus to at least:
   cause a first device to be associated with a second device based on proximity-based communication;
   receive, at the first device, an indication of an incoming request for communication, received on the second device from a third device, wherein the indication of the incoming request for communication from the third device is transmitted to the first device from the second device via the proximity-based communication;
   in response to receiving, at the first device, the indication of the incoming request for communication, cause the first device to provide an indication, via a user interface of the first device, of the incoming request for communication received on the second device from the third device; and
   receive an indication of a user input provided via the first device indicating acceptance or declining of the incoming request for communication received on the second device from the third device.

2. The apparatus of claim 1, wherein the indication of the incoming request for communication received on the second device from the third device is transmitted to the first device in response to an event occurring on the second device.

3. The apparatus of claim 2, wherein the event occurring on the second device comprises at least one of receiving a short message service (SMS) message, a multimedia message server (MMS) message, or an e-mail.

4. The apparatus of claim 1, wherein the provision of the indication via the user interface of the first device is based at least partially on a capability of the first device.

5. The apparatus of claim 1, wherein the incoming request for communication received on the second device from the third device is a phone call received at the second device.

6. The apparatus of claim 5, wherein the user input indicates to reject the phone call.

7. The apparatus of claim 6 wherein the at least one memory and the program code instructions are further configured to, with the at least one processor, cause the apparatus to at least: in response to the user input indicating to reject the phone call, initiate transmission of a message to a sender of the incoming request for communication.

8. The apparatus of claim 5, wherein the user input indicates to accept the phone call, and the at least one memory and the program code instructions are further configured to, with the at least one processor, cause the apparatus to at least: enable communication on the accepted phone call with a speaker and a microphone of the first device.

9. The apparatus of claim 1, wherein the incoming request for communication received on the second device from the third device is a short message service (SMS) communication received at the second device.

10. The apparatus of claim 1, wherein the at least one memory and the program code instructions are further configured to, with the at least one processor, cause the apparatus to at least:
    cause a first user interface area to be presented on a first device; and
    cause a second user interface area to be presented on the first device, the second user interface providing a visual indication of the incoming request for communication received on the second device from the third device, wherein the first user interface area is displayed concurrently with the second user interface area.

11. The apparatus of claim 10, wherein the user input comprises at least an interaction with the first user interface area and the second user interface area.

12. A method comprising:
    causing a first device to be associated with a second device based on proximity-based communication;
    receiving, at the first device, an indication of an incoming request for communication received on the second device from a third device, wherein the indication of the incoming request for communication from the third device is transmitted to the first device from the second device via the proximity-based communication;
    in response to receiving, at the first device, the indication of the incoming request for communication from the third device, causing the first device to provide an indication, via a user interface of the first device, of the incoming request for communication received on the second device from the third device; and
    receiving an indication of a user input provided via the first device indicating acceptance or declining of the incoming request for communication received on the second device from the third device.

13. The method of claim 12, wherein the indication of the incoming request for communication received on a second device from the third device is transmitted to the first device in response to an event occurring on the second device.

14. The method of claim 13, wherein the event occurring on the second device comprises at least one of receiving a short message service (SMS) message, a multimedia message server (MMS) message, or an e-mail.

15. The method of claim 12, wherein the provision of the indication via the user interface of the first device is based at least partially on a capability of the first device.

16. The method of claim 12, wherein the incoming request for communication received on the second device from the third device is a phone call received at the second device.

17. The method of claim 16, wherein the user input indicates to reject the phone call.

18. The method of claim 17, wherein the method further comprises: in response to the user input indicating to reject the phone call, initiating transmission of a message to a sender of the incoming request for communication.

19. The method of claim 16, wherein the user input indicates to accept the phone call, and the at least one memory and the program code instructions are further configured to, with the at least one processor, cause the apparatus to at least: enable communication on the accepted phone call with a speaker and a microphone of the first device.

20. A computer program product comprising a non-transitory computer readable medium storing computer program code portions therein, the computer program code portions being configured to, upon execution, cause an apparatus to at least:
- cause a first device to be associated with a second device based on proximity-based communication;
- receive, at the first device, an indication of an incoming request for communication received on the second device from a third device, wherein the indication of the incoming request for communication from the third device is transmitted to the first device from the second device via the proximity-based communication;
- in response to receiving, at the first device, the indication of the incoming request for communication, cause the first device to provide an indication, via a user interface of the first device, of the incoming request for communication received on the second device from the third device; and
- receive an indication of a user input provided via the first device indicating acceptance or declining of the incoming request for communication received on the second device from the third device.

* * * * *